US012028258B2

United States Patent
Nakazato et al.

(10) Patent No.: US 12,028,258 B2
(45) Date of Patent: Jul. 2, 2024

(54) TRAFFIC TRANSFER SYSTEM, TRAFFIC TRANSFER METHOD, DATA COLLECTION DEVICE, TRAFFIC TRANSFER DEVICE, AND PROGRAM

(71) Applicant: Nippon Telegraph and Telephone Corporation, Tokyo (JP)

(72) Inventors: Hikotoshi Nakazato, Musashino (JP); Kenji Abe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1 day.

(21) Appl. No.: 17/770,734

(22) PCT Filed: Oct. 24, 2019

(86) PCT No.: PCT/JP2019/041719
§ 371 (c)(1),
(2) Date: Apr. 21, 2022

(87) PCT Pub. No.: WO2021/079463
PCT Pub. Date: Apr. 29, 2021

(65) Prior Publication Data
US 2023/0073913 A1  Mar. 9, 2023

(51) Int. Cl.
*H04L 47/20* (2022.01)
*H04L 41/16* (2022.01)
*H04L 47/2416* (2022.01)

(52) U.S. Cl.
CPC .............. *H04L 47/20* (2013.01); *H04L 41/16* (2013.01); *H04L 47/2416* (2013.01)

(58) Field of Classification Search
CPC ...... H04L 47/20; H04L 41/16; H04L 47/2416
See application file for complete search history.

(56) References Cited

U.S. PATENT DOCUMENTS

| 2005/0198682 | A1* | 9/2005 | Wright .................... H04L 47/32 725/95 |
| 2008/0225687 | A1* | 9/2008 | Oksman .............. H04L 41/0893 370/201 |
| 2019/0349610 | A1 | 11/2019 | Higo et al. |
| 2019/0373085 | A1 | 12/2019 | Higo et al. |

FOREIGN PATENT DOCUMENTS

| JP | 2007-228459 | 9/2007 |
| JP | 2009-259020 | 11/2009 |
| JP | 2017-091440 | 5/2017 |
| JP | 2017-215694 | 12/2017 |
| JP | 2018-133023 | 8/2018 |
| WO | WO 2018/142866 | 8/2018 |
| WO | WO 2018/142874 | 8/2018 |

\* cited by examiner

*Primary Examiner* — Adnan M Mirza
(74) *Attorney, Agent, or Firm* — Fish & Richardson P.C.

(57) ABSTRACT

A data collection apparatus in a traffic transfer system collects and transfers low-bit-rate traffic data from an IoT device, and transfers high-bit-rate traffic data in an identified area. A traffic transfer apparatus performs determination as to whether or not a service-supported event occurs, by inputting the low-bit-rate traffic data into a learner and, when occurrence is determined, acquires and transfers the high-bit-rate traffic data in the identified area. The traffic transfer apparatus causes the learner to relearn a result of analysis of the transferred high-bit-rate traffic data and the low-bit-rate traffic data used in the determination.

11 Claims, 6 Drawing Sheets

TRAFFIC TRANSFER SYSTEM, TRAFFIC TRANSFER METHOD, DATA COLLECTION DEVICE, TRAFFIC TRANSFER DEVICE, AND PROGRAM

CROSS-REFERENCE TO RELATED APPLICATION

This application is a National Stage Application of PCT/JP2019/041719, filed on Oct. 24, 2019, and which application is incorporated herein by reference. To the extent appropriate, a claim of priority is made to the above disclosed application.

TECHNICAL FIELD

The present invention relates to a traffic transfer system, a traffic transfer method, a data collection apparatus, a traffic transfer apparatus, and a program that allow traffic to be transferred from an IoT (Internet of Things) device to an appropriate service.

BACKGROUND ART

In these days, IoT has continued expanding rapidly, and an enormous number of diverse and various devices have been connected to networks. It has been predicted that 50 billion devices would be connected to the Internet by 2020, and more and more devices are expected to be installed in a variety of environments such as homes, factories, and streets in the future. Business operators in various fields including, for example, transportation, fishery and agriculture, medical care, disaster prevention, manufacture, tourism, entertainment, and the like, have begun to provide services by using information acquired by IoT devices.

Services using image analysis, in particular, are being diversified due to advance of image recognition technology using machine learning, and an explosive rise in the number of IoT devices handling video data from cameras and the like causes a rapid increase in uplink traffic volume. In the future, high-bit-rate traffic is expected to make up a further more proportion of an overall data amount, due to demand for higher quality of video data, demand for real-time image processing, and the like.

FIG. 1 is a diagram for describing a predicted future situation of services using IoT devices.

Service providers will provide services S using image analysis in a variety of fields including, for example, transportation $S_1$, fishery and agriculture $S_2$, medical care $S_3$, disaster prevention $S_4$, manufacture $S_5$, tourism $S_6$, entertainment $S_7$, and the like. At the time, rapid increases are seen in the number of IoT devices that collect video data as high-bit-rate traffic data (hereinafter, referred to as "IoT device (H)" in some cases) by using security cameras $A_1, A_2, A_3, A_4$, on-board cameras $B_1, B_2, B_3$, and the like, as well as in the number of IoT devices that collect low-bit-rate traffic data (hereinafter, referred to as "IoT device (L)" in some cases), such as an acceleration sensor $a_1$, an illuminance sensor $b_1$, sound sensors $c_1, c_2$, a humidity sensor $d_1$, a temperature sensor $e_1$, and a rainfall sensor $f_1$, and accordingly, the amount of uplink traffic data passing through an IoT management platform M increases.

On the other hand, DSA (data stream assist) technology has been studied as a technology that implements services requiring high-bit-rate traffic data such as camera videos (see Patent Literatures 1, 2). According to the DSA technology, one transfer apparatus (server) can receive high-bit-rate traffic data such as camera videos from distribution source nodes, extract a content that is appropriate for each of services with different requirements, and transfer the contents over traffic corresponding to the respective services.

CITATION LIST

Patent Literatures

Patent Literature 1: International Publication No. WO2018/142866
Patent Literature 2: International Publication No. WO2018/142874

SUMMARY OF THE INVENTION

Technical Problems

However, in the DSA technology, a traffic transfer destination is determined statically. In other words, an IoT device such as a camera and a traffic transfer destination are associated with each other beforehand, and high-bit-rate traffic data is transmitted to a service provider side, regardless of whether or not an event needed to cause service provision occurs. For example, in a situation where IoT devices supporting a certain service are deployed in areas nationwide, when a tracking-target object is moving, many high-bit-rate traffic data are transferred even from IoT devices situated in areas in which the tracking target is not present. Accordingly, when the DSA technology is used, transfer efficiency is lowered in some cases. Moreover, at the time, the transfer apparatus (server) processes data that is not used for the service, so that application processing efficiency is also lowered.

If a future rapid increase in the number of IoT devices is considered, further enhancement is required in traffic transfer efficiency and application processing efficiency, while service quality is maintained.

The present invention has been made in view of such respects, and an object of the present invention is to enhance traffic transfer efficiency and application processing efficiency with respect to transfer of high-bit-rate traffic data required for each service.

Means for Solving the Problems

A traffic transfer system according to the present invention is a traffic transfer system in which traffic data acquired from IoT devices is transferred to each of traffic analysis apparatuses for providing respective services, the traffic transfer system including: one or more data collection apparatuses communicationally connected to the IoT devices; and a traffic transfer apparatus communicationally connected to each of the traffic analysis apparatuses, wherein the one or more data collection apparatuses each include a data collection unit that collects, from the IoT devices in an area covered by the own data collection apparatus, high-bit-rate traffic data that meets a predetermined condition and low-bit-rate traffic data that does not meet the predetermined condition for the high-bit-rate traffic data, and a data transfer unit that extracts low-bit-rate traffic data of a predetermined type related to one of the services from the collected low-bit-rate traffic data based on determination type information including a set type of the IoT device used in determination of whether or not a service-supported event representing an event supported by the one of the services occurs, and transfers the extracted low-bit-rate traffic data to the traffic transfer apparatus, and that receives, from the traffic transfer apparatus, an instruction to transfer high-bit-rate traffic data from the IoT device situated in an identified area that is identified as an area in which it is estimated that the service-supported event occurs, and transfers the high-bit-rate traffic data from the IoT device situated in the identified area to the traffic transfer apparatus, and the traffic transfer apparatus includes a learner that, when the low-bit-rate traffic data is inputted, determines whether or not a service-supported event preset for each of the services occurs, in accordance with an algorithm based on machine learning, a first analysis section that determines whether or not the service-supported event occurs by inputting the received low-bit-rate traffic data into the learner, an area identification section that determines the identified area when it is determined that the service-supported event occurs, a device identification section that identifies the IoT device situated in the identified area, and transmits, to the data collection apparatus covering the identified IoT device, the instruction to transfer high-bit-rate traffic data, a traffic transfer section that receives, from the data collection apparatus, the high-bit-rate traffic data from the IoT device situated in the identified area, and transfers the received high-bit-rate traffic data to the traffic analysis apparatus for each service, and a learning section that acquires, from the traffic analysis apparatus, a result of analysis of the transferred high-bit-rate traffic data as to whether or not the service-supported event occurs, and causes the learner to relearn, as training data, the result of the analysis and the low-bit-rate traffic data used in the determination by the learner.

Advantageous Effects of the Invention

According to the present invention, traffic transfer efficiency and application processing efficiency can be enhanced with respect to transfer of high-bit-rate traffic data required for each service.

DESCRIPTION OF EMBODIMENTS

Next, an embodiment for carrying out the present invention (hereinafter, referred to as the "present embodiment") will be described. First, an outline of a traffic transfer system 100 according to the present embodiment will be described.

<Outline>

Figure 1:
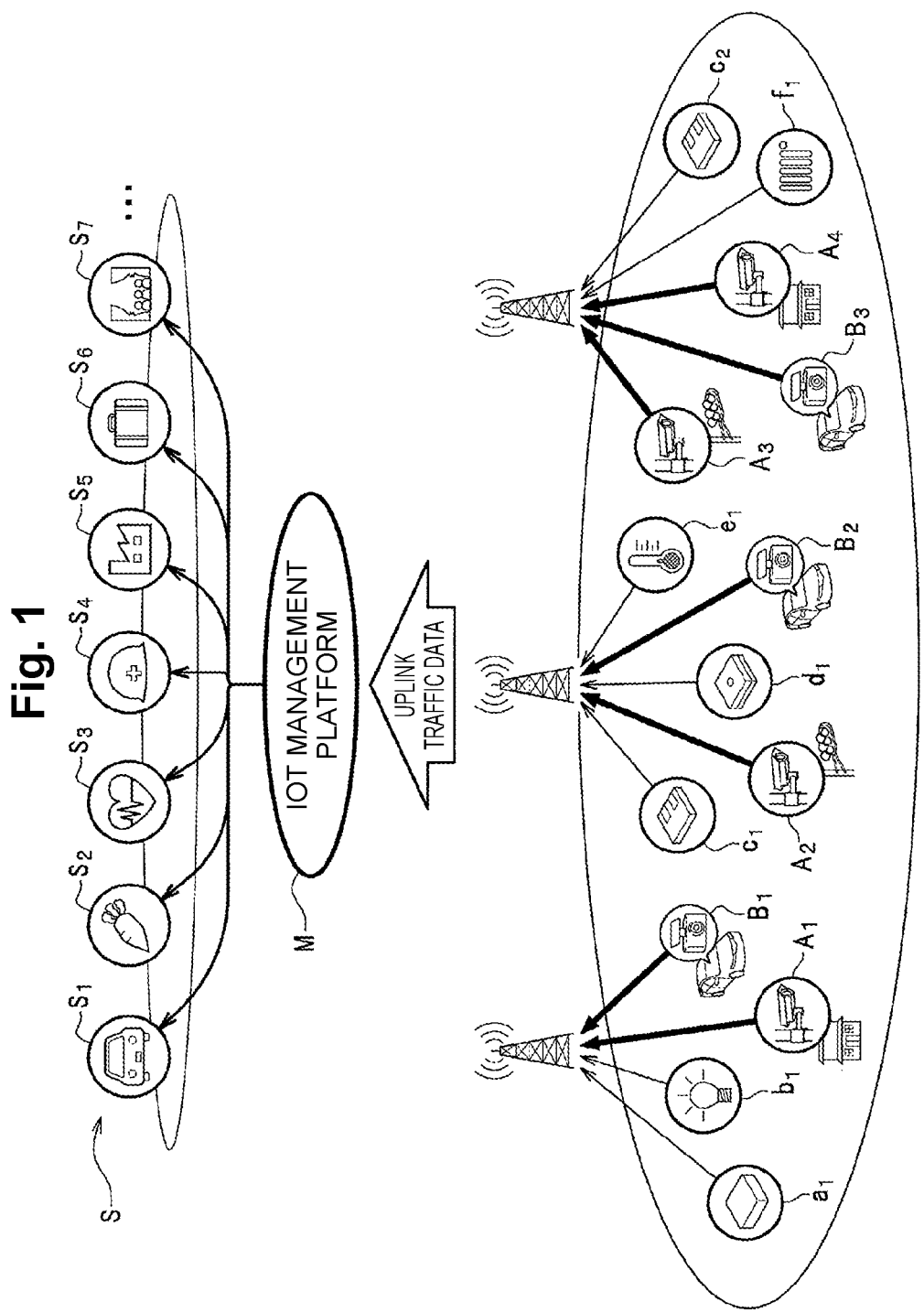
FIG. 1 is a diagram for describing a predicted future situation of services using IoT devices.
Figure 2:
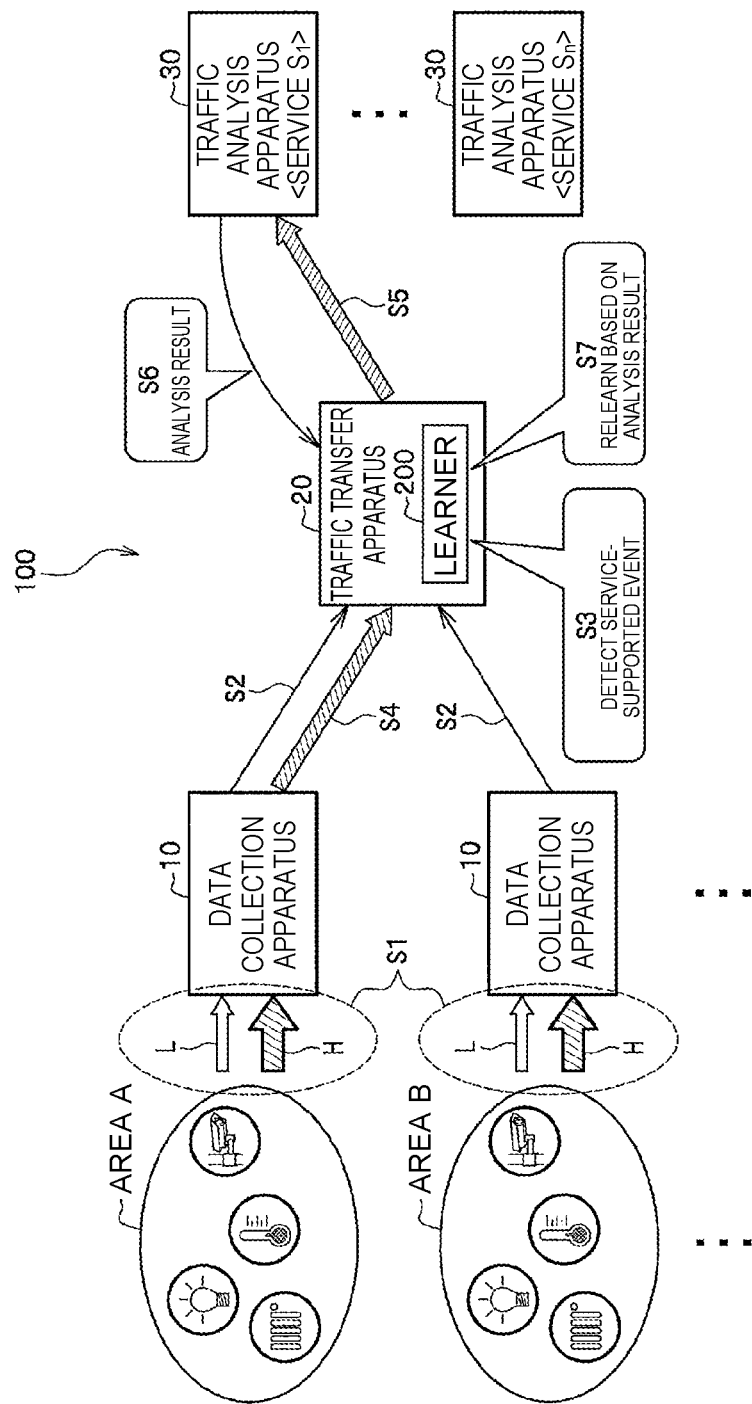
FIG. 2 is a diagram for describing an outline of processing in a traffic transfer system according to a present embodiment.

FIG. 2 is a diagram for describing an outline of processing in the traffic transfer system 100 according to the present embodiment.

The traffic transfer system 100 according to the present embodiment includes data collection apparatuses 10, each of which is communicationally connected to IoT devices in each area (areas A, B, . . . ), respectively, and a traffic transfer apparatus 20 communicationally connected to traffic analysis apparatuses 30, which analyze traffic for respective services S included in service providers, respectively.

Each data collection apparatus 10 collects, from IoT devices situated in a predetermined area, data of high-bit-rate traffic (hereinafter, referred to as "high-bit-rate traffic data"; denoted by a sign "H" in FIG. 2) and data of low-bit-rate traffic (hereinafter, referred to as "low-bit-rate traffic data"; denoted by a sign "L" in FIG. 2) that is other traffic than the high-bit-rate traffic (step S1). Then, each data collection apparatus 10 first transmits only the low-bit-rate traffic data to the traffic transfer apparatus 20 (step S2).

In the present embodiment, a description is given in which, for example, traffic data that is video data from security cameras and on-board cameras is treated as high-bit-rate traffic data, and traffic data of other types than video data is treated as low-bit-rate traffic data. However, irrespective of such an example, a predetermined condition regarding traffic data may be preset, and traffic data may be determined to be high-bit-rate traffic data and processed as such when the traffic data meets the predetermined condition, and traffic data may be determined to be low-bit-rate traffic data and processed as such when the traffic data does not meet the predetermined condition. For example, a predetermined threshold value of bit rate may be preset, and traffic data may be determined to be high-bit-rate traffic data when the predetermined threshold value is exceeded, and to be low-bit-rate traffic data when the predetermined threshold is not exceeded, and may be processed as such.

The traffic transfer apparatus 20 includes a learner 200 that, when receiving low-bit-rate traffic data as input, determines whether or not a specified event preset for each service occurs, and outputs a result of the determination.

The traffic transfer apparatus 20, by inputting low-bit-rate traffic data acquired from any data collection apparatus 10 into the learner 200, determines whether or not an event supported by a specified service (hereinafter, referred to as "service-supported event") occurs (step S3: detect a service-supported event). When it is determined that a service-supported event occurs, the traffic transfer apparatus 20 identifies an area in which the service-supported event occurs, acquires, from the data collection apparatus 10, high-bit-rate traffic data from an IoT device (H) situated in the identified area (step S4), and transmits the high-bit-rate traffic data to a traffic analysis apparatus 30 included in a corresponding service provider (step S5).

In the traffic analysis apparatus 30, analysis is performed, through image recognition processing on the high-bit-rate traffic data, as to whether or not the service-supported event occurs. The traffic transfer apparatus 20 receives, from the traffic analysis apparatus 30, information on a result of the analysis as to whether or not the service-supported event actually occurs (step S6).

Subsequently, the traffic transfer apparatus 20 causes the learner 200 to relearn based on the received result of the analysis (step S7). Specifically, for example, when "correct" is indicated by the result of the analysis of the high-bit-rate traffic data transmitted to the traffic analysis apparatus 30 upon the determination that the service-supported event occurs (the analysis indicates that the service-supported event actually occurs), the traffic transfer apparatus 20 causes the learner 200 to relearn, as training data, an indication of "correct" and the low-bit-rate traffic data used in the determination in step S3. When "incorrect" is indicated by the result of the analysis of the high-bit-rate traffic data transmitted to the traffic analysis apparatus 30 upon the determination that the service-supported event occurs (the analysis indicates that the service-supported event actually does not occur), the traffic transfer apparatus 20 causes the learner 200 to relearn, as training data, an indication of "incorrect" and the low-bit-rate traffic data used in the determination in step S3.

By causing the learner 200 to relearn based on a result of analysis as described above, accuracy can be enhanced in detection of occurrence of a service-supported event by the learner 200 using low-bit-rate traffic data.

Thus, in the traffic transfer system 100, high-bit-rate traffic data need not always be transmitted to the traffic analysis apparatus 30 of each service provider, and high-bit-rate traffic data can be transferred only when a service-supported event is detected by using low-bit-rate traffic data.

Moreover, high-bit-rate traffic data to be transferred to the traffic analysis apparatuses 30 can be changed flexibly according to a change in situation in an external world (for example, movement of a tracking-target object).

Figure 3:
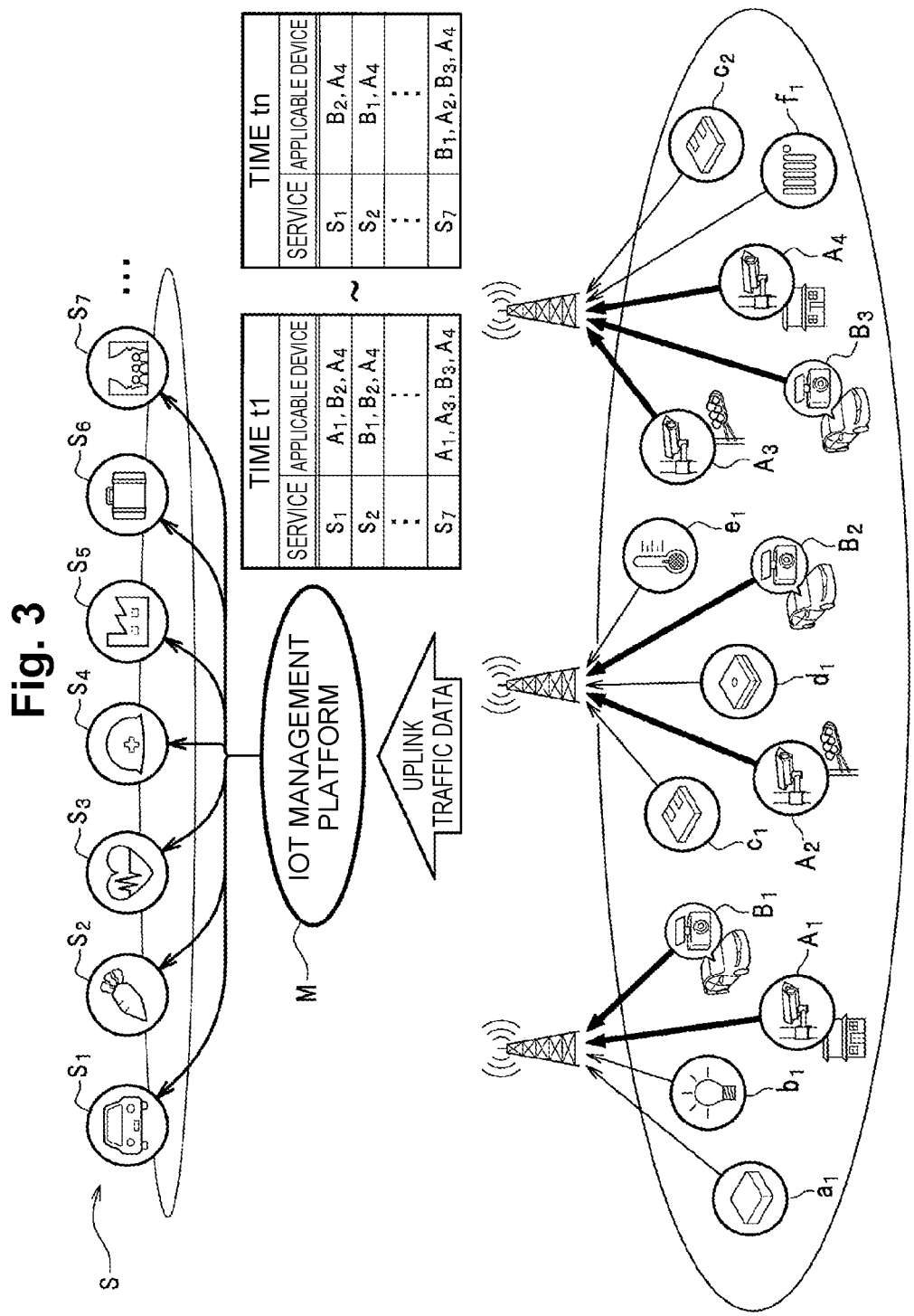
FIG. 3 is a diagram for describing effects of the traffic transfer system according to the present embodiment.

For example, as shown in FIG. 3, at each of times (t1 to tn), high-bit-rate traffic data may be transferred only from an applicable device (IoT device (H)) in an area in which a service-supported event is detected, and high-bit-rate traffic data need not be transferred from all IoT devices (H) at all times.

Accordingly, according to the traffic transfer system 100, traffic transfer efficiency and application processing efficiency can be enhanced with respect to transfer of high-bit-rate traffic data required for each service.

Present Embodiment

Next, the traffic transfer system 100 and the like will be described in detail.

Figure 4:
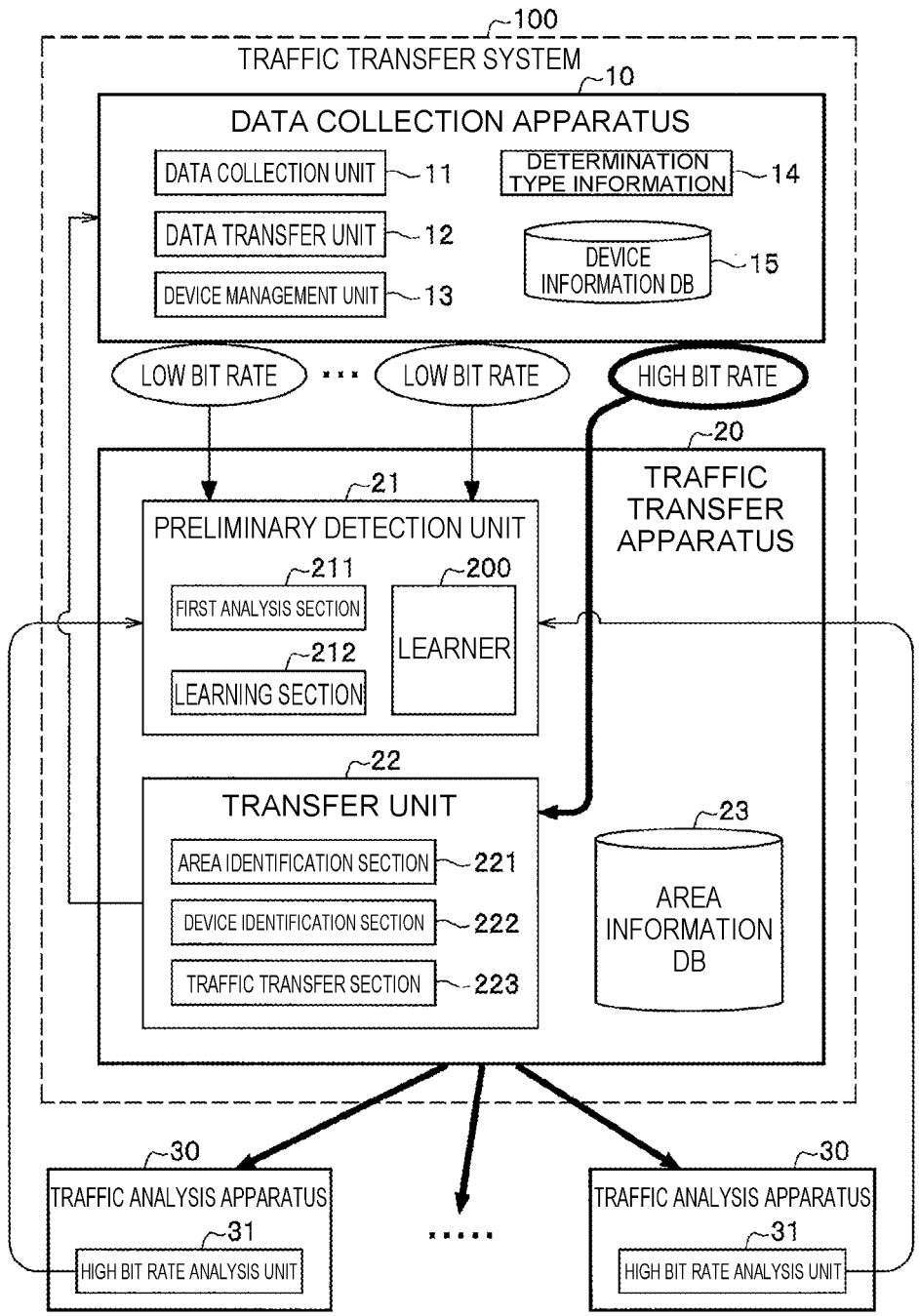
FIG. 4 shows an entire configuration of the traffic transfer system according to the present embodiment.

FIG. 4 is a diagram showing an entire configuration of the traffic transfer system 100 according to the present embodiment.

The traffic transfer system 100 includes the one or more data collection apparatuses 10, each of which is communicationally connected to IoT devices (depiction of which is omitted) in each area, respectively, and the traffic transfer apparatus 20 communicationally connected to the plurality of traffic analysis apparatuses 30 relating to the respective services S ($S_1, S_2, \ldots, S_n$) included in the service providers, respectively.

<<Data Collection Apparatus>>

Each data collection apparatus 10 collects data (sensing data) from IoT devices (sensor devices) in an own covered area, in a centralized manner. A following description will be given, assuming that one data collection apparatus 10 covers one area. However, irrespective of such an example, one data collection apparatus 10 may cover a plurality of areas.

Each data collection apparatus 10 first transmits collected low-bit-rate traffic data to the traffic transfer apparatus 20. When the data collection apparatus 10 receives an instruction to transfer high-bit-rate traffic data from the traffic transfer apparatus 20, the data collection apparatus 10 transmits the relevant high-bit-rate traffic data to the traffic transfer apparatus 20.

Each of the data collection apparatuses 10 is implemented by a computer including a control unit, an input-output unit, and a storage unit (depiction of each of which is omitted). More specifically, as shown in a functional block diagram in FIG. 4, each data collection apparatus 10 includes a data collection unit 11, a data transfer unit 12, a device management unit 13, determination type information 14, and a device information DB (DataBase) 15.

The data collection unit 11 collects, from each IoT device, low-bit-rate traffic data such as acceleration, illuminance, sound, humidity, temperature, rainfall, wind speed, and (river) water level, and high-bit-rate traffic data such as video data. Note that to traffic data collected by the data collection unit 11, identification information on each IoT device that transmits the traffic data is added. Accordingly, an IoT device that has transmitted acquired data can be identified.

The data transfer unit 12 extracts low-bit-rate traffic data of a type related to a set service from the data collected by the data collection unit 11, and transfers the extracted data to the traffic transfer apparatus 20 at predetermined time intervals.

Note that the storage unit (depiction of which is omitted) of each data collection apparatus 10 stores a type of low-bit-rate traffic data that is required to determine whether or not an event supported by a service (service-supported event) occurs, as the determination type information 14, for each service.

The data transfer unit 12 transfers data that matches a type indicated by the determination type information 14, of all the collected low-bit-rate traffic data, to the traffic transfer apparatus 20, as information for determining whether or not a service-supported event occurs, with respect to the service of interest.

For example, in a service for traffic accident detection, the data transfer unit 12 transfers information on vibration sensed by an acceleration sensor installed on a guardrail and information on sound (a sound of collision) sensed by a sound sensor to the traffic transfer apparatus 20 as low-bit-rate traffic data. In a service for fire detection, the data transfer unit 12 transfers information on temperature sensed by a temperature sensor and information on humidity sensed by a humidity sensor to the traffic transfer apparatus 20 as low-bit-rate traffic data. In a service for recognizing a state of damage caused by a disaster (for example, a typhoon), the data transfer unit 12 transfers information on rainfall sensed by a rainfall sensor and information on wind speed sensed by a wind speed sensor to the traffic transfer apparatus 20 as low-bit-rate traffic data. In a service for crime prevention (detecting occurrence of a crime and tracking a criminal), the data transfer unit 12 transfers information on sound and voice sensed by a sound sensor to the traffic transfer apparatus 20 as low-bit-rate traffic data.

Moreover, when an instruction to transfer high-bit-rate traffic data is received from the traffic transfer apparatus 20, the data transfer unit 12 transfers high-bit-rate traffic data from an IoT device (High) situated in an identified area (details of which will be described later) to the traffic transfer apparatus 20.

Note that in the traffic transfer system 100, not only a case is possible where all IoT devices (H) that transmit high-bit-rate traffic data and exist in an area are kept in operation, but only one or some IoT devices (H) may be brought in operation. In such a case, in the traffic transfer system 100, an IoT device (H) to be brought in operation in an area is specified beforehand based on a predetermined logic (operating device determination logic), and when the traffic transfer apparatus 20 determines that a service-supported event occurs in a specific area (identified area), an IoT device (H) on standby in the area is brought in operation, and detailed data from the area is acquired.

Here, the predetermined logic (operating device determination logic) may be configured to select an IoT device (H) at random, or may take into consideration characteristics of a service content and an IoT device installation place and may be configured to preferentially bring an IoT device (H) in operation that is situated at a place where a service-supported event supported by a service of interest is thought to be more easily detected, for example, at a building entrance, a ticket gate of a station, or the like.

By keeping one or some IoT devices (High) on standby as described above, an uplink traffic volume can be reduced as a whole, compared to a case where all IoT devices (High) are kept in operation. A following description will be given, assuming that one or some IoT devices (High) are kept on standby.

The device management unit 13 manages an IoT device covered by the own data collection apparatus 10, by storing, in the device information DB15, a type (for example, acceleration, temperature, humidity, sound and voice, video, or the like), position information on the device, and an operation status ("in operation" or "on standby") as device information, in association with identification information on the IoT device.

Moreover, the device management unit 13 refers to the device information DB15, and activates an IoT device (H) on standby situated in an area (identified area) identified by the traffic transfer apparatus 20 as an area in which it is highly probable that a service-supported event occurs, with respect to each service. The IoT device activated by the device management unit 13 here is a device that transmits video data as high-bit-rate traffic data.

Furthermore, when the device management unit 13 receives, from the traffic transfer apparatus 20, predicted area setting information indicating an instruction to transfer high-bit-rate traffic from an IoT device (H) in a predicted area (details of which will be described later) in which a service-supported event is predicted to occur, the device management unit 13 activates a device on standby among IoT devices (H) situated in the predicted area.

Note that when the device management unit 13 activates the IoT device (H) in the predicted area, the data transfer unit 12 transfers the high-bit-rate traffic data from the IoT device (H) situated in the predicted area to the traffic transfer apparatus 20.

<<Traffic Transfer Apparatus>>

The traffic transfer apparatus 20 determines whether or not a service-supported event occurs with respect to a preset service, by inputting low-bit-rate traffic data acquired from a data collection apparatus 10 into the learner 200. When it is determined that a service-supported event occurs, the traffic transfer apparatus 20 identifies an area in which the service-supported event occurs. Further, the traffic transfer apparatus 20 acquires high-bit-rate traffic data from an IoT device (H) situated in the identified area via the data collection apparatus 10, and transfers the high-bit-rate traffic data to a traffic analysis apparatus 30 included in a corresponding service provider.

Moreover, the traffic transfer apparatus 20 receives, from the traffic analysis apparatus 30, information on a result of analysis as to whether or not the service-supported event actually occurs, and causes the learner 200 to relearn based on the result of the analysis.

The traffic transfer apparatus 20 is implemented by a computer (see FIG. 6) including a control unit, an input-output unit, and a storage unit (depiction of each of which is omitted). More specifically, as shown in the functional block diagram in FIG. 4, the traffic transfer apparatus 20 includes a preliminary detection unit 21, a transfer unit 22, and an area information DB 23.

The preliminary detection unit 21 includes the learner 200, a first analysis section 211, and a learning section 212.

When low-bit-rate traffic data is inputted, the learner 200 determines whether or not a service-supported event preset for each service occurs, and outputs a result of the determination.

The first analysis section 211 determines whether or not a service-supported event occurs, by inputting low-bit-rate traffic data corresponding to each service acquired from each data collection apparatus 10 into the learner 200. When it is determined that a service-supported event occurs, the first analysis section 211 outputs information on occurrence of the service-supported event to the transfer unit 22.

The learning section 212 receives, from a traffic analysis apparatus 30, information on a result of analysis as to whether or not a service-supported event actually occurs in an identified area. The learning section 212 causes the learner 200 to relearn based on the received result of the analysis. Specifically, for example, when "correct" is indicated by a result of analysis of high-bit-rate traffic data transmitted to a traffic analysis apparatus 30 upon determination that a service-supported event occurs (analysis indicates that the service-supported event actually occurs), the learning section 212 causes the learner 200 to relearn, as training data, an indication of "correct" and corresponding low-bit-rate traffic data. When "incorrect" is indicated by a result of analysis of high-bit-rate traffic data transmitted to a traffic analysis apparatus 30 upon determination that a service-supported event occurs (analysis indicates that the service-supported event actually does not occur), the learning section 212 causes the learner 200 to relearn, as training data, an indication of "incorrect" and corresponding low-bit-rate traffic data.

Note that the learner 200 can be implemented by a machine learning scheme (algorithm) using time-series data. Specifically, for example, RNN (recurrent neural network), SVM (support vector machine), decision tree, k-means clustering, or the like can be used.

The learner 200 may be caused to go through policy-based learning in an initial stage. For example, in the service for crime prevention (detecting occurrence of a crime and tracking a criminal), the learner 200 is caused to learn sets of sound and voice information such as "help" and "thief" and information on occurrence of a crime (occurrence of a service-supported event) as training data (teaching data). In the service for fire detection, the learner 200 is caused to learn sets of information on typical temperatures and degrees of humidity at a time of fire and information on occurrence of fire (occurrence of a service-supported event) as training data (teaching data). Further, a learning period may be provided as necessary, and the learner 200 may be caused to learn by using results of analysis from the traffic analysis apparatuses 30 and to repeat learning until desired accuracy is achieved.

In addition to the types of low-bit-rate traffic data indicated by the determination type information 14 stored beforehand in the data collection apparatuses 10, the learner 200 may be caused to learn another type of low-bit-rate traffic data, and the determination type information 14 may be updated so as to include the additional type when accuracy is enhanced in determination of occurrence of a service-supported event with respect to the service of interest.

When the transfer unit 22 receives information on occurrence of a service-supported event from the preliminary detection unit 21, the transfer unit 22 identifies an area in which it is highly probable that the service-supported event occurs, based on position information on an IoT device (L) that detects the service-supported event. The transfer unit 22 identifies an IoT device (H) situated in the identified area, and transmits, to a data collection apparatus 10 accommodating the identified IoT device (H), an instruction to transfer high-bit-rate traffic data. Thus, the transfer unit 22 acquires the high-bit-rate traffic data from the data collection apparatus 10, and transmits the high-bit-rate traffic data to a traffic analysis apparatus 30 included in a corresponding service provider.

The area information DB 23 stores, in association with identification information on each data collection apparatus 10, information on an area covered by the data collection apparatus 10 and position information on IoT devices in the area.

As shown in FIG. 4, the transfer unit 22 includes an area identification section 221, a device identification section 222, and a traffic transfer section 223.

The area identification section 221 acquires, by referring to the area information DB 23, position information on an IoT device (L) from which a service-supported event is detected by the first analysis section 211 of the preliminary detection unit 21, and identifies an area (identified area) in which it is highly probable that the service-supported event occurs, based on a predetermined logic (identified area determination logic) using the acquired position information. The area identification section 221 outputs information on the identified area to the device identification section 222.

For example, when occurrence of a service-supported event is determined based on low-bit-rate traffic data from a plurality of IoT devices (L), the predetermined logic to determine an identified area (identified area determination logic) is configured to calculate a barycentric position of position information on the plurality of IoT devices (L), and to determine, as the identified area, an area within, for example, a radius of one kilometer from the calculated barycentric position.

Moreover, the area identification section 221 may use such an identified area determination logic as to estimate, based on the low-bit-rate traffic data, a position where the service-supported event occurs, and to determine, as the identified area, an area within, for example, a radius of one kilometer from the estimated position. The estimated position is calculated based on an analysis algorithm using the low-bit-rate traffic data, such as by estimating a position where the service-supported event occurs by using, for example, when the IoT device (L) is a sound sensor, information on loudness or a direction of a sound sensed by the sound sensor.

The method of determining an identified area (identified area determination logic) is preset in the area identification section 221. A range (distance) set from the barycentric position or the estimated position for the identified area may be set differently for each service.

Furthermore, the area identification section 221 may set an area further outside of the identified area (a predetermined area), as a predicted area. The predicted area is an area in which a service-supported event is predicted to occur in the future, and is set in order to acquire high-bit-rate traffic data beforehand (before detection by the preliminary detection unit 21).

The predicted area may be set differently for each service. For example, a predicted area is set 2 km outside of an identified area for a certain service, and a predicted area is set 500 m outside of an identified area for another service. Assuming that an interval at which a specific type of sensor devices are deployed is one hop, an area within n hops (n: a positive integer) may be set as a predicted area.

The area identification section 221 may store identified areas in a time series for a certain service, and may set a predetermined area situated in a traveling direction as a predicted area.

When a predicted area is set, the area identification section 221 outputs information on the predicted area to the device identification section 222.

The device identification section 222 identifies, by referring to the area information DB 23, an IoT device (H) situated in the area identified by the area identification section 221 (an identified area), and transmits, to a data collection apparatus 10 covering the identified IoT device (H), an instruction to transfer high-bit-rate traffic data.

At the time, also with respect to an IoT device (H) on standby situated in the identified area, the device identification section 222 may transmit, to the data collection apparatus 10, an instruction to activate such a device and transfer high-bit-rate traffic data (transfer instruction). Thus, each traffic analysis apparatus 30 can perform more detailed image data analysis with higher service quality.

When the device identification section 222 acquires information on the predicted area from the area identification section 221, the device identification section 222 identifies an IoT device (H) situated in the predicted area by referring to the area information DB 23. Moreover, the device identification section 222 transmits, to a data collection apparatus 10 covering the predicted area, predicted area setting information for instructing the data collection apparatus 10 covering the identified IoT device (H) to transmit high-bit-rate traffic data from the IoT device (H).

Further, when a service-supported event in an identified area ceases while the area identification section 221 determines identified areas in a time sequential manner, for example, when a tracking-target object moves and goes out of an identified area, the device identification section 222 cancels an instruction to transfer high-bit-rate traffic from an IoT device (H) in the identified area. Thus, the traffic transfer apparatus 20 can stop transfer of unnecessary high-bit-rate traffic data, and traffic transfer efficiency and application processing efficiency can be further enhanced.

The traffic transfer section 223 transmits the high-bit-rate traffic data acquired, via the data collection apparatus 10, from the IoT device (H) situated in the area identified by the area identification section 221 (the identified area), to a traffic analysis apparatus 30 included in a corresponding service provider.

Moreover, the traffic transfer section 223 transmits the high-bit-rate traffic data acquired, via the data collection apparatus 10, from the IoT device (H) situated in the predicted area, to the traffic analysis apparatus 30 included in the corresponding service provider.

Note that the traffic transfer section 223 may be configured to transfer high-bit-rate traffic data to a traffic analysis apparatus 30 by using the DSA technology as described in Patent Literatures 1, 2.

<<Traffic Analysis Apparatus>>

The traffic analysis apparatuses 30 are apparatuses that analyze high-bit-rate traffic data with respect to the respective service S included in the service providers, respectively, and provide the services.

Each traffic analysis apparatus 30 includes a high bit rate analysis unit 31, which, when acquiring high-bit-rate traffic data generated by an IoT device (H) in an identified area from the traffic transfer apparatus 20, analyzes the data (image data) and determines whether or not a service-supported event occurs. The high bit rate analysis unit 31 outputs a result of the determination to the traffic transfer apparatus 20 (the preliminary detection unit 21).

The high bit rate analysis unit 31 of each traffic analysis apparatus 30 acquires high-bit-rate traffic data generated by an IoT device (H) in a predicted area from the traffic transfer apparatus 20, and performs processing of analyzing the data (image data) and determining whether or not a service-supported event occurs.

<Processing Flow>

Next, a flow of processing performed in the traffic transfer system 100 will be described.

Figure 5:
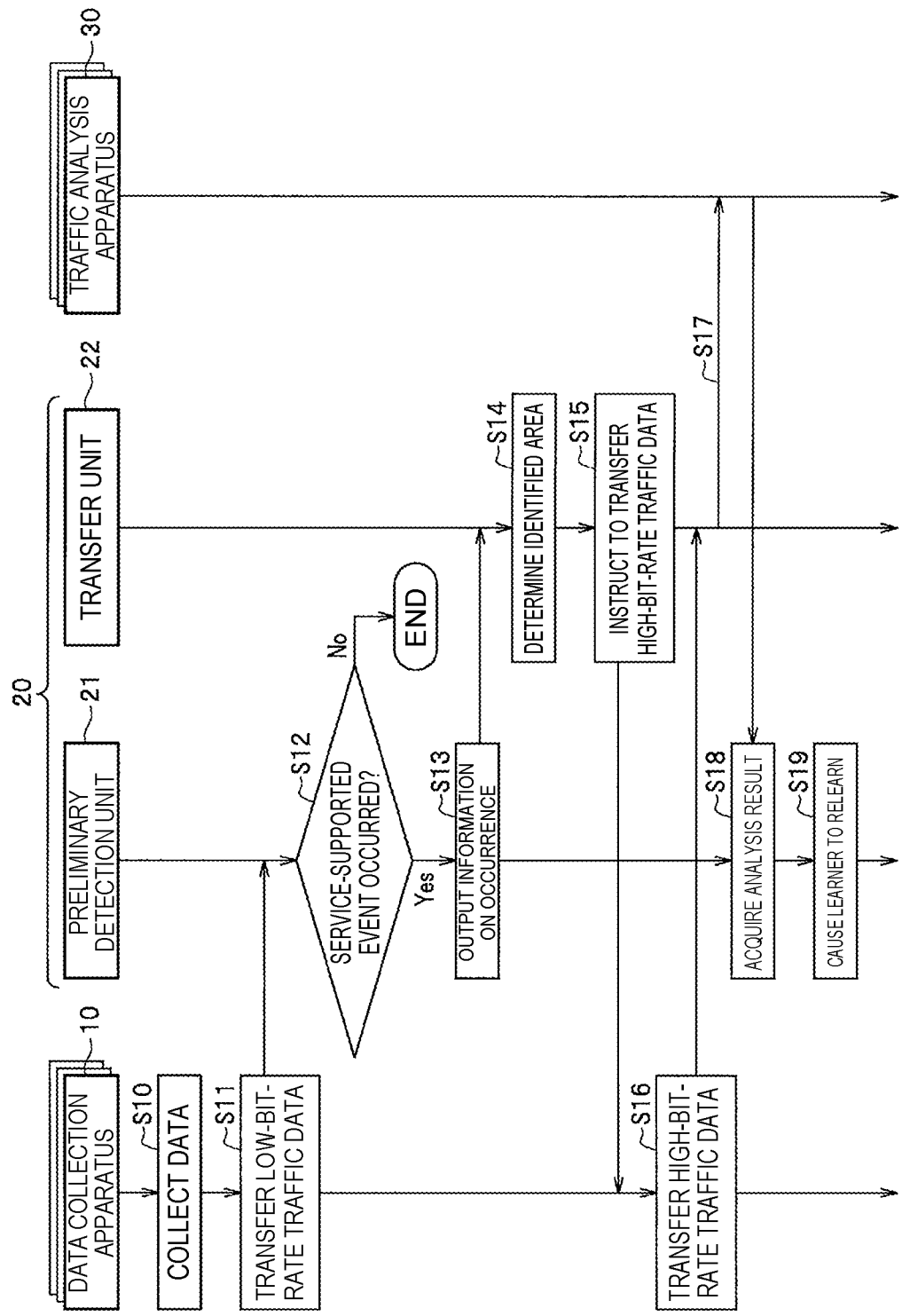
FIG. 5 is a sequence chart showing a flow of the processing in the traffic transfer system according to the present embodiment.

FIG. 5 is a sequence chart showing the flow of processing in the traffic transfer system 100 according to the present embodiment.

First, the data collection unit 11 of each data collection apparatus 10 collects data from IoT devices situated in each respective area (step S10). Specifically, the data collection unit 11 collects low-bit-rate traffic data and high-bit-rate traffic data from IoT devices in the area covered by the own data collection apparatuses 10.

Note that with respect to IoT devices (H) transmitting high-bit-rate traffic data that is video data, data is not collected from all devices situated in the area, but one or some IoT devices may be kept on standby, and an IoT device (H) from which video data is collected may be specified.

Next, for each preset service, the data transfer unit 12 of each data collection apparatus 10 extracts low-bit-rate traffic data of a type related to the service from the traffic data collected by the data collection unit 11, and transfers the extracted data to the traffic transfer apparatus 20 at predetermined time intervals (step S11).

When the low-bit-rate traffic data is acquired from any data collection apparatus 10, the preliminary detection unit 21 (the first analysis section 211) of the traffic transfer apparatus 20 determines whether or not a service-supported event occurs, by inputting the low-bit-rate traffic data into the learner 200 (step S12).

Here, when it is determined that a service-supported event does not occur (step S12→No), the preliminary detection unit 21 terminates the processing.

When it is determined that a service-supported event occurs (step S12→Yes), the preliminary detection unit 21 outputs information on occurrence of the service-supported event to the transfer unit 22 (step S13).

Subsequently, the transfer unit 22 (area identification section 221) identifies an area in which the service-supported event occurs, based on position information on an IoT device (L) from which the service-supported event is detected by the preliminary detection unit 21 (step S14: determine an identified area). For example, the area identification section 221 determines an area within a radius of one kilometer from a barycentric position of a plurality of IoT devices (L) from which the service-supported event is detected, as an identified area.

Here, the area identification section 221 may also set an area (predicted area) in which the service-supported event is predicted to occur in the future.

Then, the transfer unit 22 (the device identification section 222) identifies, by referring to the area information DB 23, an IoT device (H) situated in the area identified by the area identification section 221 (the identified area), and transmits, to a data collection apparatus 10 covering the identified IoT device (H), an instruction to transfer high-bit-rate traffic data (step S15).

When the area identification section 221 sets a predicted area, the device identification section 222 identifies, by referring to the area information DB 23, an IoT device (H) situated in the predicted area, and transmits, also to a data collection apparatus 10 covering the identified IoT device (H), an instruction to transfer high-bit-rate traffic.

The data collection apparatus 10 that receives the instruction to transfer high-bit-rate traffic data transfers the high-bit-rate traffic data from the IoT device (H) situated in the identified area to the traffic transfer apparatus 20 (step S16).

Specifically, the device management unit 13 of the data collection apparatus 10 checks, by referring to the device information DB 15, whether or not an IoT device (H) on standby exists in the identified area, and transmits an activation instruction if an IoT device (H) on standby exists. The data collection unit 11 collects the high-bit-rate traffic data from the IoT device (H) in the identified area, and the data transfer unit 12 transfers the collected high-bit-rate traffic data to the traffic transfer apparatus 20.

With respect to the IoT device (H) situated in the predicted area, as in the case of the IoT device (H) in the identified area, the data collection apparatus 10 activates a device on standby, if any, and transfers the high-bit-rate traffic data to the traffic transfer apparatus 20.

Next, the transfer unit 22 (traffic transfer section 223) of the traffic transfer apparatus 20 transmits the received high-bit-rate traffic data to a traffic analysis apparatus 30 included in a corresponding service provider (step S17).

Thus, traffic analysis is performed by the traffic analysis apparatus 30 of each service provider, to analyze whether or not the service-supported event actually occurs. When the service-supported event occurs, a service is provided by the service provider.

Subsequently, the preliminary detection unit 21 (the learning section 212) of the traffic transfer apparatus 20 acquires, from the traffic analysis apparatus 30, information on a result of the analysis as to whether or not the service-supported event actually occurs in the identified area (analysis result information) (step S18).

The learning section 212 causes the learner 200 to relearn, as training data, the result of the analysis and the corresponding low-bit-rate traffic data (step S19), and the processing is terminated.

Thus, in the traffic transfer system 100 according to the present embodiment, occurrence of a service-supported event can be detected with high accuracy based on low-bit-rate traffic data, and it is therefore not necessary to always transmit all high-bit-rate traffic data to the traffic analysis apparatus 30 of each service provider. Accordingly, traffic transfer efficiency and application processing efficiency can be enhanced with respect to transfer of high-bit-rate traffic data required for each service.

<Hardware Configuration>

Figure 6:
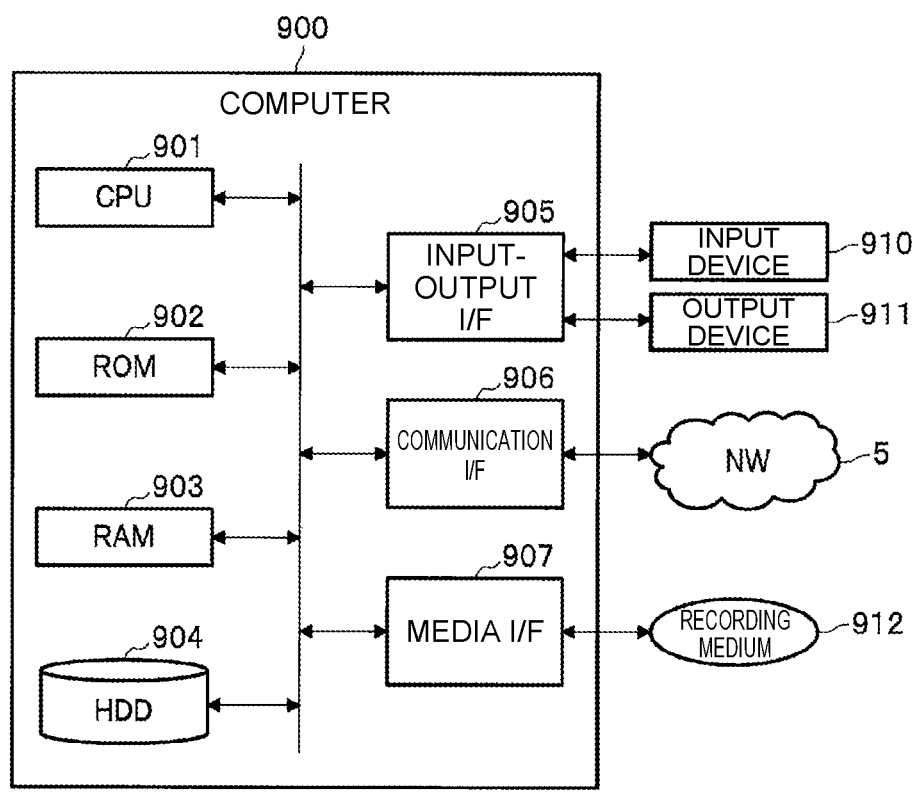
FIG. 6 is a hardware configuration diagram showing an example of a computer that implements functions of a traffic transfer apparatus according to the present embodiment.

The traffic transfer apparatus 20 according to the present embodiment is implemented by, for example, a computer 900 with a configuration as shown in FIG. 6.

FIG. 6 is a hardware configuration diagram showing an example of the computer 900 that implements functions of the traffic transfer apparatus 20 according to the present embodiment. The computer 900 includes a CPU (Central Processing Unit) 901, a ROM (Read Only Memory) 902, a RAM (Random Access Memory) 903, an HDD (Hard Disk Drive) 904, an input-output I/F (Interface) 905, a communication I/F 906, and a media I/F 907.

The CPU 901 operates based on a program stored in the ROM 902 or the HDD 904, and performs control by the control unit (the preliminary detection unit 21 and the transfer unit 22 shown in FIG. 4). The ROM 902 stores a boot program to be executed by the CPU 901 when the computer 900 is activated, a program related to hardware of the computer 900, and the like.

The CPU 901 controls an input device 910, such as a mouse or a keyboard, and an output device 911, such as a display or a printer, via the input-output I/F 905. The CPU 901 acquires data from the input device 910 and outputs generated data to the output device 911 via the input-output I/F 905. For a processor, a GPU (Graphics Processing Unit) or the like may be used together with the CPU 901.

The HDD 904 stores a program to be executed by the CPU 901, and data and the like to be used by the program. The communication I/F 906 receives data from another apparatus (for example, a data collection apparatus 10 or a traffic analysis apparatus 30) via a communication network (for example, a NW (Network) 5) and outputs the data to the CPU 901, and transmits data generated by the CPU 901 to another apparatus via the communication network.

The media I/F 907 reads a program or data stored in a recording medium 912, and outputs the program or data to the CPU 901 via the RAM 903. The CPU 901 loads a program related to intended processing onto the RAM 903 from the recording medium 912 via the media I/F 907, and executes the loaded program. The recording medium 912 is an optical recording medium such as a DVD (Digital Versatile Disc) or a PD (Phase change rewritable Disk), a magneto-optical recording medium such as an MO (Magneto Optical disk), a magnetic recording medium, a conductor memory tape medium, a semiconductor memory, or the like.

For example, when the computer 900 functions as the traffic transfer apparatus 20 according to the present embodiment, the CPU 901 of the computer 900 implements functions of the traffic transfer apparatus 20 by executing a program loaded onto the RAM 903. Data in the RAM 903 is stored in the HDD 904. The CPU 901 reads a program related to intended processing from the recording medium 912 and executes the program. In addition, the CPU 901 may read a program related to intended processing from another apparatus via the communication network (NW 5).

<Effects>

Hereinafter, effects of the traffic transfer system and the like according to the present invention will be described.

The traffic transfer system according to the present invention is the traffic transfer system 100 in which traffic data acquired from IoT devices is transferred to each of the traffic analysis apparatuses 30 for providing respective services, the traffic transfer system 100 including: the one or more data collection apparatuses 10 communicationally connected to the IoT devices, and the traffic transfer apparatus 20 communicationally connected to each of the traffic analysis apparatuses 30, wherein the one or more data collection apparatuses 10 each include the data collection unit 11 that collects, from the IoT devices in an area covered by the own data collection apparatus 10, high-bit-rate traffic data that meets a predetermined condition and low-bit-rate traffic data that does not meet the predetermined condition for the high-bit-rate traffic data, and the data transfer unit 12 that, based on the determination type information 14 including a set type of the IoT device used in determination of whether or not a service-supported event representing an event supported by one of the services occurs, extracts low-bit-rate traffic data of a predetermined type related to the service from the collected low-bit-rate traffic data, and transfers the extracted low-bit-rate traffic data to the traffic transfer apparatus 20, and that receives, from the traffic transfer apparatus 20, an instruction to transfer high-bit-rate traffic data from the IoT device situated in an identified area that is identified as an area in which it is estimated that the service-supported event occurs, and transfers the high-bit-rate traffic data from the IoT device situated in the identified area to the traffic transfer apparatus 20, and the traffic transfer apparatus 20 includes the learner 200 that, when the low-bit-rate traffic data is inputted, determines whether or not a service-supported event preset for each of the services occurs, in accordance with an algorithm based on machine learning, the first analysis section 211 that determines whether or not the service-supported event occurs by inputting the received low-bit-rate traffic data into the learner 200, the area identification section 221 that, when it is determined that the service-supported event occurs, determines the identified area based on a predetermined identified area determination logic using position information on the IoT device generating the inputted low-bit-rate traffic data, the device identification section 222 that identifies the IoT device situated in the identified area, and transmits, to the data collection apparatus 10 covering the identified IoT device, the instruction to transfer high-bit-rate traffic data, the traffic transfer section 223 that receives, from the data collection apparatus 10, the high-bit-rate traffic data from the IoT device situated in the identified area, and transfers the received high-bit-rate traffic data to the traffic analysis apparatus 30 for each service, and the learning section 212 that acquires, from the traffic analysis apparatus 30, a result of analysis of the transferred high-bit-rate traffic data as to whether or not the service-supported event occurs, and causes the learner 200 to relearn, as training data, the result of the analysis and the low-bit-rate traffic data used in the determination by the learner 200.

Thus, in the traffic transfer system 100, high-bit-rate traffic data need not always be transmitted to the traffic analysis apparatus 30 of each service provider, and high-bit-rate traffic data can be transferred only when a service-supported event is detected by using low-bit-rate traffic data.

Moreover, in the traffic transfer system 100, high-bit-rate traffic data to be transferred to the traffic analysis apparatuses 30 can be changed flexibly according to a change in situation in an external world (for example, movement of a tracking-target object).

Accordingly, according to the traffic transfer system 100, traffic transfer efficiency and application processing efficiency can be enhanced with respect to transfer of high-bit-rate traffic data required for each service.

In the traffic transfer system 100, the device identification section 222 of the traffic transfer apparatus 20 cancels the instruction to transfer high-bit-rate traffic data when the service-supported event in the identified area does not occur.

Thus, when a service-supported event in an identified area ceases, the traffic transfer apparatus 20 can stop transfer of unnecessary high-bit-rate traffic data. Accordingly, according to the traffic transfer system 100, traffic transfer efficiency and application processing efficiency can be further enhanced.

In the traffic transfer system 100, among the IoT devices generating the high-bit-rate traffic data, only one or some devices are brought in operation, and the other devices are kept on standby, the one or more data collection apparatuses 10 each further include a device management unit 13 that, when the instruction to transfer high-bit-rate traffic data from the IoT device situated in the identified area is received from the traffic transfer apparatus 20, activates the IoT device on standby situated in the identified area, and the data transfer unit 12 transfers, to the traffic transfer apparatus 20, the high-bit-rate traffic data in the identified area including the high-bit-rate traffic data generated by the activated IoT device.

Thus, in the traffic transfer system 100, not all IoT devices generating high-bit-rate traffic data are kept in operation, but devices on standby are provided, whereby uplink traffic data transmitted to a system side can be reduced. Note that in the traffic transfer system 100, since an IoT device in the identified area is activated when a service-supported event occurs, service quality can also be maintained.

In the traffic transfer system 100, the area identification section 221 of the traffic transfer apparatus 20 sets, outside of the identified area, a predicted area representing an area in which the service-supported event is predicted to occur, the device identification section 222 identifies the IoT device situated in the set predicted area, and transmits, to the data collection apparatus 10 covering the identified IoT device, the instruction to transfer high-bit-rate traffic data, and the data transfer units 12 of the data collection apparatuses 10 transfer the high-bit-rate traffic data from the IoT devices situated in the identified area and the predicted area to the traffic transfer apparatus 20.

Thus, the area identification section 221 of the traffic transfer apparatus 20 sets the predicted area outside of the identified area, and transfers high-bit-rate traffic data beforehand, whereby occurrence of a service-supported event can be recognized earlier and more reliably. Accordingly, for a service using high-bit-rate traffic data, service quality can be enhanced.

The data collection apparatus according to the present invention is the data collection apparatus 10 that collects traffic data from IoT devices, including: the data collection unit 11 that collects, from the IoT devices, high-bit-rate traffic data that meets a predetermined condition and low-bit-rate traffic data that does not meet the predetermined condition for the high-bit-rate traffic data; and the data transfer unit 12 that, based on the determination type information including a set type of the IoT device used in determination of whether or not a service-supported event representing an event supported by a service using the traffic data occurs, extracts and outputs low-bit-rate traffic data of a predetermined type related to the service from the collected low-bit-rate traffic data, and that receives an instruction to transfer high-bit-rate traffic data from the IoT device situated in an identified area that is identified as an area in which it is estimated that the service-supported event occurs, and outputs the high-bit-rate traffic data from the IoT device situated in the identified area.

Thus, the data collection apparatus 10 can extract and output a predetermined type of low-bit-rate traffic data used in determination of whether or not a service-supported event occurs. Moreover, the data collection apparatus 10 may output only high-bit-rate traffic data that the data collection apparatus 10 is instructed to transfer. Accordingly, according to the data collection apparatus 10, the amount of outputted traffic data can be reduced, compared to a case where all high-bit-rate traffic is outputted.

The traffic transfer apparatus according to the present invention is the traffic transfer apparatus 20 that transfers traffic data acquired from IoT devices to each of the traffic analysis apparatuses 30 for providing respective services, and that includes the learner 200 that, when low-bit-rate traffic data that is traffic data that does not meet a predetermined condition for determining high-bit-rate traffic data is inputted, determines whether or not a service-supported event preset for each of the services occurs, in accordance with an algorithm based on machine learning, including: the first analysis section 211 that determines whether or not the service-supported event occurs by acquiring and inputting the low-bit-rate traffic data into the learner 200; the area identification section 221 that, when it is determined that the service-supported event occurs, determines an identified area that is an area in which it is estimated that the service-supported event occurs; the device identification section 222 that identifies the IoT device situated in the identified area, and outputs an instruction to transfer high-bit-rate traffic data generated by the identified IoT device; the traffic transfer section 223 that receives the high-bit-rate traffic data from the IoT device situated in the identified area, and transfers the received high-bit-rate traffic data to the traffic analysis apparatus 30 for each service; and the learning section 212 that acquires, from the traffic analysis apparatus 30, a result of analysis of the transferred high-bit-rate traffic data as to whether or not the service-supported event occurs, and causes the learner 200 to relearn, as training data, the result of the analysis and the low-bit-rate traffic data used in the determination by the learner 200.

Thus, the traffic transfer apparatus 20 need not always transmit high-bit-rate traffic data to the traffic analysis apparatus 30 of each service provider, and can transfer high-bit-rate traffic data only when a service-supported event is detected by using low-bit-rate traffic data.

Accordingly, according to the traffic transfer apparatus 20, traffic transfer efficiency and application processing efficiency can be enhanced with respect to transfer of high-bit-rate traffic data required for each service.

Note that the present invention is not limited to the above-described embodiments, and various modifications can be made by persons ordinarily skilled in the art within the technical idea of the present invention.

For example, in the traffic transfer system 100, each data collection apparatus 10 and the traffic transfer apparatus 20 are described as apparatuses with different bodies. However, each data collection apparatus 10 and the traffic transfer apparatus 20 may be configured as a single body, and may be configured to collect and process traffic data from all areas.

Moreover, the preliminary detection unit 21 and the transfer unit 22 in the traffic transfer apparatus 20 may be configured as apparatuses with different bodies.

REFERENCE SIGNS LIST

10 Data collection apparatus
11 Data collection unit
12 Data transfer unit
13 Device management unit
14 Determination type information
15 Device information DB
20 Traffic transfer apparatus
21 Preliminary detection unit
22 Transfer unit
23 Area information DB
30 Traffic analysis apparatus
31 High bit rate analysis unit
100 Traffic transfer system
200 Learner
211 First analysis section
212 Learning section
221 Area identification section 222 Device identification section
223 Traffic transfer section

The invention claimed is:

1. A traffic transfer system in which traffic data acquired from IoT (Internet of Things) devices is transferred to each of traffic analysis apparatuses for providing respective services, the traffic transfer system comprising:
   one or more data collection apparatuses communicationally connected to the IoT devices; and
   a traffic transfer apparatus communicationally connected to each of the traffic analysis apparatuses,
   wherein the one or more data collection apparatuses each include
   a data collection unit, including one or more processors, that collects, from the IoT devices in an area covered by the own data collection apparatus, high-bit-rate traffic data that meets a predetermined condition and low-bit-rate traffic data that does not meet the predetermined condition for the high-bit-rate traffic data, and
   a data transfer unit, including one or more processors, that extracts low-bit-rate traffic data of a predetermined type related to one of the services from the collected low-bit-rate traffic data based on determination type information including a set type of the IoT device used in determination of whether or not a service-supported event representing an event supported by the one of the services occurs, and transfers the extracted low-bit-rate traffic data to the traffic transfer apparatus, and that receives, from the traffic transfer apparatus, an instruction to transfer high-bit-rate traffic data from the IoT device situated in an identified area that is identified as an area in which it is estimated that the service-supported event occurs, and transfers the high-bit-rate traffic data from the IoT device situated in the identified area to the traffic transfer apparatus, and
   the traffic transfer apparatus includes
   a learner that, when the low-bit-rate traffic data is inputted, determines whether or not a service-supported event preset for each of the services occurs, in accordance with an algorithm based on machine learning,
   a first analysis section that determines whether or not the service-supported event occurs by inputting the received low-bit-rate traffic data into the learner,
   an area identification section that determines the identified area when it is determined that the service-supported event occurs,
   a device identification section that identifies the IoT device situated in the identified area, and transmits, to the data collection apparatus covering the identified IoT device, the instruction to transfer high-bit-rate traffic data,
   a traffic transfer section that receives, from the data collection apparatus, the high-bit-rate traffic data from the IoT device situated in the identified area, and transfers the received high-bit-rate traffic data to the traffic analysis apparatus for each service, and
   a learning section that acquires, from the traffic analysis apparatus, a result of analysis of the transferred high-bit-rate traffic data as to whether or not the service-supported event occurs, and causes the learner to relearn, as training data, the result of the analysis and the low-bit-rate traffic data used in the determination by the learner.

2. The traffic transfer system according to claim 1, wherein the first analysis section determines, at each predetermined time, whether or not the service-supported event occurs, and accordingly, the data transfer unit dynamically changes, for each time period, an association between the high-bit-rate traffic data from the IoT device identified as a result of determination that the service-supported event occurs and each of the traffic analysis apparatuses to become a destination of the high-bit-rate traffic data.

3. The traffic transfer system according to claim 2, wherein the device identification section cancels the instruction to transfer high-bit-rate traffic data when the service-supported event in the identified area does not occur.

4. The traffic transfer system according to claim 2, wherein among the IoT devices generating the high-bit-rate traffic data, only one or more devices are brought in operation, and the other devices are kept on standby,
   the one or more data collection apparatuses each further include a device management unit, including one or more processors, that, when the instruction to transfer high-bit-rate traffic data from the IoT device situated in the identified area is received from the traffic transfer apparatus, activates the IoT device on standby situated in the identified area, and
   the data transfer unit transfers, to the traffic transfer apparatus, the high-bit-rate traffic data in the identified area including the high-bit-rate traffic data generated by the activated IoT device.

5. The traffic transfer system according to claim 2, wherein the area identification section of the traffic transfer apparatus sets, outside of the identified area, a predicted area representing an area in which the service-supported event is predicted to occur,
   the device identification section identifies the IoT device situated in the set predicted area, and transmits, to the data collection apparatus covering the identified IoT device, the instruction to transfer high-bit-rate traffic data, and
   the data transfer units of the data collection apparatuses transfer the high-bit-rate traffic data from the IoT devices situated in the identified area and the predicted area to the traffic transfer apparatus.

6. A traffic transfer method for a traffic transfer system in which traffic data acquired from Internet of Things (IoT) devices is transferred to each of traffic analysis apparatuses for providing respective services,
   wherein the traffic transfer system includes one or more data collection apparatuses communicationally connected to the IoT devices, and a traffic transfer apparatus communicationally connected to each of the traffic analysis apparatuses,
   the one or more data collection apparatuses each execute:
   collecting, from the IoT devices in an area covered by the own data collection apparatus, high-bit-rate traffic data that meets a predetermined condition and low-bit-rate traffic data that does not meet the predetermined condition for the high-bit-rate traffic data;
   extracting low-bit-rate traffic data of a predetermined type related to one of the services from the collected low-bit-rate traffic data based on determination type information including a set type of the IoT device used in determination of whether or not a service-supported event representing an event supported by one of the services occurs, transferring the extracted low-bit-rate traffic data to the traffic transfer apparatus, receiving, from the traffic transfer apparatus, an instruction to transfer high-bit-rate traffic data from the IoT device situated in an identified area that is identified as an area in which it is estimated that the service-supported event occurs, and transferring the high-bit-rate traffic data from the IoT device situated in the identified area to the traffic transfer apparatus, and the traffic transfer apparatus includes a learner that, when the low-bit-rate traffic data is inputted, determines whether or not a service-supported event preset for each of the services occurs, in accordance with an algorithm based on machine learning, the traffic transfer apparatus executes:

determining whether or not the service-supported event occurs by inputting the received low-bit-rate traffic data into the learner;

determining the identified area when it is determined that the service-supported event occurs;

identifying the IoT device situated in the identified area, and transmitting, to the data collection apparatus covering the identified IoT device, the instruction to transfer high-bit-rate traffic data;

receiving, from the data collection apparatus, the high-bit-rate traffic data from the IoT device situated in the identified area, and transferring the received high-bit-rate traffic data to the traffic analysis apparatus for each service; and acquiring, from the traffic analysis apparatus, a result of analysis of the transferred high-bit-rate traffic data as to whether or not the service-supported event occurs, and causing the learner to relearn, as training data, the result of the analysis and the low-bit-rate traffic data used in the determination by the learner.

7. A traffic transfer apparatus that transfers traffic data acquired from Internet of Things (IoT) devices to each of traffic analysis apparatuses for providing respective services, and that includes a learner that, when low-bit-rate traffic data that is traffic data that does not meet a predetermined condition for determining high-bit-rate traffic data is inputted, determines whether or not a service-supported event preset for each of the services occurs, in accordance with an algorithm based on machine learning, comprising:

a first analysis section that determines whether or not the service-supported event occurs by acquiring and inputting the low-bit-rate traffic data into the learner;

an area identification section that, when it is determined that the service-supported event occurs, determines an identified area that is an area in which it is estimated that the service-supported event occurs;

a device identification section that identifies the IoT device situated in the identified area, and outputs an instruction to transfer high-bit-rate traffic data generated by the identified IoT device;

a traffic transfer section that receives the high-bit-rate traffic data from the IoT device situated in the identified area, and transfers the received high-bit-rate traffic data to the traffic analysis apparatus for each service; and a learning section that acquires, from the traffic analysis apparatus, a result of analysis of the transferred high-bit-rate traffic data as to whether or not the service-supported event occurs, and causes the learner to relearn, as training data, the result of the analysis and the low-bit-rate traffic data used in the determination by the learner.

8. A non-transitory computer-readable medium comprising a program for causing a computer to function as a traffic transfer apparatus that transfers traffic data acquired from Internet of Things (IoT) devices to each of traffic analysis apparatuses for providing respective services, and that includes a learner that, when low-bit-rate traffic data that is traffic data that does not meet a predetermined condition for determining high-bit-rate traffic data is inputted, determines whether or not a service-supported event preset for each of the services occurs, in accordance with an algorithm based on machine learning, comprising:

a first analysis section that determines whether or not the service-supported event occurs by acquiring and inputting the low-bit-rate traffic data into the learner;

an area identification section that, when it is determined that the service-supported event occurs, determines an identified area that is an area in which it is estimated that the service-supported event occurs;

a device identification section that identifies the IoT device situated in the identified area, and outputs an instruction to transfer high-bit-rate traffic data generated by the identified IoT device;

a traffic transfer section that receives the high-bit-rate traffic data from the IoT device situated in the identified area, and transfers the received high-bit-rate traffic data to the traffic analysis apparatus for each service; and a learning section that acquires, from the traffic analysis apparatus, a result of analysis of the transferred high-bit-rate traffic data as to whether or not the service-supported event occurs, and causes the learner to relearn, as training data, the result of the analysis and the low-bit-rate traffic data used in the determination by the learner.

9. The traffic transfer system according to claim 3, wherein among the IoT devices generating the high-bit-rate traffic data, only one or some devices are brought in operation, and the other devices are kept on standby, the one or more data collection apparatuses each further include a device management unit that, when the instruction to transfer high-bit-rate traffic data from the IoT device situated in the identified area is received from the traffic transfer apparatus, activates the IoT device on standby situated in the identified area, and the data transfer unit transfers, to the traffic transfer apparatus, the high-bit-rate traffic data in the identified area including the high-bit-rate traffic data generated by the activated IoT device.

10. The traffic transfer system according to claim 3, wherein the area identification section of the traffic transfer apparatus sets, outside of the identified area, a predicted area representing an area in which the service-supported event is predicted to occur, the device identification section identifies the IoT device situated in the set predicted area, and transmits, to the data collection apparatus covering the identified IoT device, the instruction to transfer high-bit-rate traffic data, and the data transfer units of the data collection apparatuses transfer the high-bit-rate traffic data from the IoT devices situated in the identified area and the predicted area to the traffic transfer apparatus.

11. The traffic transfer system according to claim 4, wherein the area identification section of the traffic transfer apparatus sets, outside of the identified area, a predicted area representing an area in which the service-supported event is predicted to occur, the device identification section identifies the IoT device situated in the set predicted area, and transmits, to the data collection apparatus covering the identified IoT device, the instruction to transfer high-bit-rate traffic data, and the data transfer units of the data collection apparatuses transfer the high-bit-rate traffic data from the IoT devices situated in the identified area and the predicted area to the traffic transfer apparatus.

* * * * *